United States Patent [19]
Plumat et al.

[11] 4,102,665
[45] Jul. 25, 1978

[54] DIFFUSION TREATMENTS FOR MODIFYING THE PROPERTIES OF GLASS AND VITROCRYSTALLINE MATERIALS

[75] Inventors: Emile Plumat, Gilly; Pol Baudin, Ransart; Robert Van Laethem, Loverval; Jean Deliefe, Montigny sur Sambre, all of Belgium

[73] Assignee: Glaverbel-Mecaniver, Watermael-Boitsfort, Belgium

[21] Appl. No.: 691,064

[22] Filed: May 28, 1976

Related U.S. Application Data

[63] Continuation of Ser. No. 111,493, Feb. 1, 1971, abandoned.

[30] Foreign Application Priority Data

Feb. 3, 1970 [GB] United Kingdom ............ 5123/70

[51] Int. Cl.² ........................................... C03C 21/00
[52] U.S. Cl. ........................... 65/30 E; 118/DIG. 16
[58] Field of Search ............ 65/30 R, 30 E; 118/326, 118/DIG. 16, 50, 314, 659, 660

[56] References Cited

U.S. PATENT DOCUMENTS

| 3,287,201 | 12/1966 | Chisholm et al. ............ 65/30 X |
| 3,561,940 | 2/1971 | Scholes ............................ 65/30 |
| 3,677,729 | 7/1972 | Plumat ............................ 65/30 |

Primary Examiner—Kenneth M. Schor
Attorney, Agent, or Firm—Spencer & Kaye

[57] ABSTRACT

In the diffusion of ions from a contacting medium constituting a source of such ions into surface layers of a body of glass or vitrocrystalline material for the purpose of modifying at least one property of the body, the uniformity of the diffusion across the surface of the body is improved by placing the medium contacting the body in the form of a mist composed of suspended droplets of the treating medium.

16 Claims, 3 Drawing Figures

DIFFUSION TREATMENTS FOR MODIFYING THE PROPERTIES OF GLASS AND VITROCRYSTALLINE MATERIALS

CROSS-REFERENCE TO RELATED APPLICATION

This application is a continuation of application Ser. No. 111,493, filed Feb. 1, 1971, and now abandoned.

BACKGROUND OF THE INVENTION

This invention relates to a process for modifying a property of glass or vitrocrystalline material.

The term "vitrocrystalline material" denotes a material formed from glass by a treatment which produces one or more crystalline phases therein while also retaining at least one vitreous phase therein. For simplicity of expression, reference will be made hereinafter principally to glass as the material treated, although several specific examples of the treatment of vitrocrystalline materials will be given.

It is known that ions of various substances can be caused to enter the surface of a glass body from a contacting medium. By this means, various modifications can be achieved, depending on the nature of the substance which enters the glass and the conditions existing in the process. By way of example, the diffusion may bring about a change in the color of the glass or an increase in its tensile strength.

One problem which has been encountered in the performance of such a process is that of achieving a uniform modification of the glass body over the whole of its treated surface. It has been found to be difficult to solve this problem when following the usual practice of immersing the body to be treated in a bath of the treatment medium.

Another proposed treatment procedure involves discharging the liquid treatment medium onto the body to be treated so that the medium continuously streams along the body. This method appears to give better results from the standpoint of uniformity, but the pumping equipment required for recirculating the treatment medium is subject to corrosion by such medium.

SUMMARY OF THE INVENTION

A primary object of the present invention is to provide an improved solution to the above-described problem.

Another object of the invention is to increase the uniformity of such diffusion treatments.

Still another object of the invention is to increase the precision with which such treatments can be controlled.

The present invention provides an alternative way of carrying out the ion-diffusion process, affording a number of potential advantages as will hereafter be described.

According to the present invention, a process wherein at least one property of at least a part of a body of glass or vitrocrystalline material is modified as a result of the diffusion of ions into at least a part of the body from a contacting diffusion medium is carried out by placing the said medium in the form of suspended droplets forming a mist.

The invention is applicable, e.g., in the treatment of sheets of glass or vitrocrystalline material and in the treatment of hollow-ware articles.

The present invention can be applied to any diffusion treatment carried out on any type of glass or vitrocrystalline material and using any diffusion medium constituting a source of the substance which it is desired to cause to diffuse into the material. Thus, based on all experiments performed to date and to the best of applicants' knowledge, the invention will improve the uniformity of every such diffusion treatment and applicants are not aware of any feasible diffusion treatment of this type which will not be benefitted by the process of the invention. It is only necessary that the particular diffusion treatment employed be carried out under those time, temperature and pressure conditions determined to be suitable and in the presence of a suitable, e.g. inert, atmosphere.

The size of the droplets is not critical. The only important requirement is that the liquid medium be in the form of individual droplets rather than a continuous liquid phase. Generally, the larger the droplets, the more uniform the treatment.

It is possible to achieve a very uniform modification of the whole or a selected part of a given body by using the treatment medium in the form of a mist according to the present invention. Any part of a body not to be treated can be masked against exposure to the treatment medium.

Another potential advantage of the invention is that it enables a renewal of the treatment medium in contact with the body to be easily effected. Preferably the body is treated in a zone to and from which the mist flows, preferably continuously. The uniformity of the treatment is thereby improved. The movement of the mist can be maintained by convection currents or draft and it is not necessary to employ pumping equipment which is exposed to the treatment medium.

The medium leaving the treatment zone can be recycled. A very economical use of treatment medium is thus possible. If desired, any contaminating substance deriving from the treated body can be removed from the treatment medium leaving the treatment zone, before such medium is recycled. The build up of contaminants in the treatment zone, with consequent possible slowing down or impairment of the treatment, is thereby avoided.

For most purposes in view, an anhydrous treatment medium is used at a temperature appreciably in excess of 100° C, depending on the kind of modification of the body which is to be effected. At such elevated temperature the required ion diffusion occurs in a period of time which is well within acceptable limits for industrial mass production.

The treatment medium preferably comprises at least one metal salt providing metal ions for diffusion into the body. Particular preference is given to alkali metal salts. A variety of metal salts useful in processing glass or vitrocrystalline material by ion diffusion can be melted and dispersed as droplets to form a mist and can be used in that form without requiring the maintenance of very high working temperatures.

Advantageously the treatment is performed in an enclosure containing at least one pool of molten salt which is out of contact with the material being treated and from which the mist is generated.

The generation of the mist can be promoted by maintaining the interior of the enclosure at a reduced pressure. Alternatively, or in addition, the pool or pools of molten salt may be agitated to cause or promote the formation of the mist. Agitation of the molten salt is a very effective way of promoting dispersion of the salt in the form of droplets.

The concentration of the droplets suspended in the continuous vapor phase of the diffusion medium can easily be controlled by controlling the intensity of the agitation.

Preferably the body is held above a said pool of molten salt and mist is withdrawn from the treatment zone at a location above the said body. The current of mist can be maintained entirely by convection or it can be assisted by a natural or forced draft.

The pool of molten salt can be agitated by a mechanical device but a preferred simple and effective way to agitate the salt is to bubble gas through it, continuously or intermittently. Advantageously a gas is used for this purpose which also serves another purpose. For example the gas can serve as an adjuvant to promote the required ion diffusion.

The mist in the treatment zone may be subjected to the action of one or more cross currents of gas whereby the smallest of the droplets and most of the vapor phase of the mist are removed, leaving only the larger droplets to make contact with the body being treated. The effect of this removal of the smallest droplets is to promote still further the uniformity of the treatment. However, even if a substantial proportion of smaller droplets contact the body, the treatment will be more uniform than prior art treatments.

The treatment is preferably carried out so that an ion exchange occurs between the body and the droplets of treatment medium. The treatment is sometimes more satisfactory if the diffusion of ions out of the body into the treatment medium is not inhibited and it is an advantage not to have to provide an electric field for that purpose. However, the use of an electric field, whether direct or alternating, for influencing the treatment is not excluded from the scope of the invention and the use of such a field can be beneficial for promoting certain effects, e.g. for deepening the penetration of ions into the body from the treatment medium.

The invention can advantageously be applied in mass treatment processing by moving the bodies to be treated sequentially one by one or in batches into and out of the treatment zone.

The invention is of particular importance in the field of chemical tempering. In a chemical tempering treatment, an ionized substance is caused to enter the glass or vitrocrystalline body from a contacting medium and the temperature during and after such entry is controlled so that after completion of the treatment exterior layers of the body are placed in a state of compressive stress or of increased compressive stress. It is normally important to treat the body, or the part or parts thereof being tempered, as uniformly as possible or at least to avoid random and unpredictable variations in the treatment from one portion of the body to another.

A chemical tempering treatment can be performed on a vitrocrystalline body provided with a sufficient proportion of the surface of the body is constituted by a vitreous phase or phases.

The invention can be employed with very good results in the chemical tempering of the whole or parts, e.g. the margins, of sheets of glass of ordinary composition.

Usually, chemical tempering involves the replacement of ions in the body by ions deriving from the contacting treatment medium. It is possible for example to set up compressive stresses by replacing ions in exterior layers of the body with ions which confer a lower coefficient of thermal expansion on such exterior layers, at a temperature which is sufficiently high and maintained for a time sufficiently long for stress relaxation to occur, and subsequently allowing the body to cool. Alternatively, surface compressive stresses can be set up by replacing ions in exterior layers of the body with larger ions while the surface layers of the body are at an elevated temperature which however is too low to allow substantial, or at least a complete, stress relaxation in the length of time for which such temperature is maintained, the body being then cooled to normal temperature so that the induced stresses are "frozen in."

Furthermore, it is possible to induce surface compressive stresses by causing ions to enter into the body through a surface thereof from a contacting medium under the influence of an electric field. This movement of ions may be with or without an accompanying movement or equal movement of ions from the body into the contacting medium through that surface, depending on whether an alternating or a direct electric current field is employed.

When applied to the chemical tempering of a body, the invention is preferably practiced using a treatment medium comprising an alkali metal salt and under conditions such that an exchange of alkali metal ions occurs between the treatment medium and the body. Glasses and vitreous phases of ordinary composition can be very substantially strengthened by means of such an alkali metal ion exchange.

Preferably the ion exchange is an exchange of sodium ions in surface layers of the body for larger ions, e.g., potassium ions, deriving from the treatment medium, e.g. molten potassium nitrate, the temperature conditions being such that compressive stresses are set up in the surface layers as a result of the introduction of the larger ions. The temperature at which the ion exchange takes place is in this case below the temperature at which complete stress relaxation can occur in the surface layers of the body during the treatment time.

The required ion exchange can advantageously be performed using a treatment medium containing potassium nitrate and potassium carbonate. The presence of the potassium carbonate promotes the ion exchange process.

In the performance of such an ion exchange process, it is an advantage to bubble carbon dioxide through a pool of the molten salt treatment medium from which the mist is generated. The carbon dioxide serves a dual purpose. It not only agitates the molten salt and carries off molten potassium salt but also acts as an adjuvant whereby the ion exchange process is promoted. The reason for this latter effect is not yet known.

A given modification of th treated body can be brought about at a lower working temperature when the ion exchange takes place in the presence of $CO_2$, and the treatment period required for achieving a given result is made shorter. There is an advantage in having carbon dioxide present even if for only a part of the total period during which the ion exchange takes place. In particular, advantage is to be gained from the presence of carbon dioxide during the initial part of such total period.

The $CO_2$ gas can be used in mixture with an inert gas such as nitrogen.

Alternatively, or in addition, the $CO_2$ gas may be mixed with air. This has the effect of further increasing the starting rate of the ion diffusion process.

The ion exchange may alternatively be an exchange of sodium ions in surface layers of the body for ions which confer a lower coefficient of thermal expansion on such layers, the temperature conditions being such that stress relaxation can occur in such layers. The said layers then become compressively stressed when the body cools.

In this latter type of treatment, a lithium salt, e.g. lithium nitrate, may be used as the treatment medium for treating glass such as ordinary soda-lime glass initially containing sodium ions for replacement by the lithium ions.

The lithium salt may be mixed with sodium salt in order to lower the operating temperature and avoid too high a concentration of lithium ions.

Another chemical tempering process in which the invention may be employed is one wherein rubidium ions are caused to enter the body from a contacting medium of rubidium salt, such as $RbNO_3$.

The invention can also be employed in other types of processes involving the penetration of the body by one or more substances deriving from a contacting medium. Thus, for example, the invention can be employed in a process wherein a substance which modifies the appearance of the body, e.g. coloring ions, enters the body from the contacting medium, which latter may, for example comprise $AgNO_3$ or $CuNO_3$ for providing silver or copper ions.

It is possible to use a treatment medium in the form of a mist according to the present invention, not only in processes in which ion diffusion takes place into a body of glass or vitrocrystalline material, but also when the body to be treated is a body of ceramic material, provided that a sufficient number of ions that are mobile at the temperature of the treatment are present at the surface of the material to permit surface compressive stresses to be set up or increased by the said ion diffusion.

The invention includes apparatus for use in modifying at least part of a body of glass or vitrocrystalline material by a process involving the diffusion of ions into at least part of the body from a contacting medium, which apparatus includes an enclosure, means for holding a body to be treated within the enclosure, means within the enclosure for holding a pool of molten salt treatment medium, and means for agitating such molten salt to cause the atmosphere in the enclosure to become filled with a mist composed of droplets of the said molten salt. The droplets may be carried in a vapor phase of the molten salt or of a different substance.

Preferably, the agitating means includes means for bubbling gas through the pool of molten salt in the enclosure.

Preferably, means are provided for continuously or intermittently drawing off mist from within the enclosure.

DESCRIPTION OF THE PREFERRED EMBODIMENTS

Figure 1:
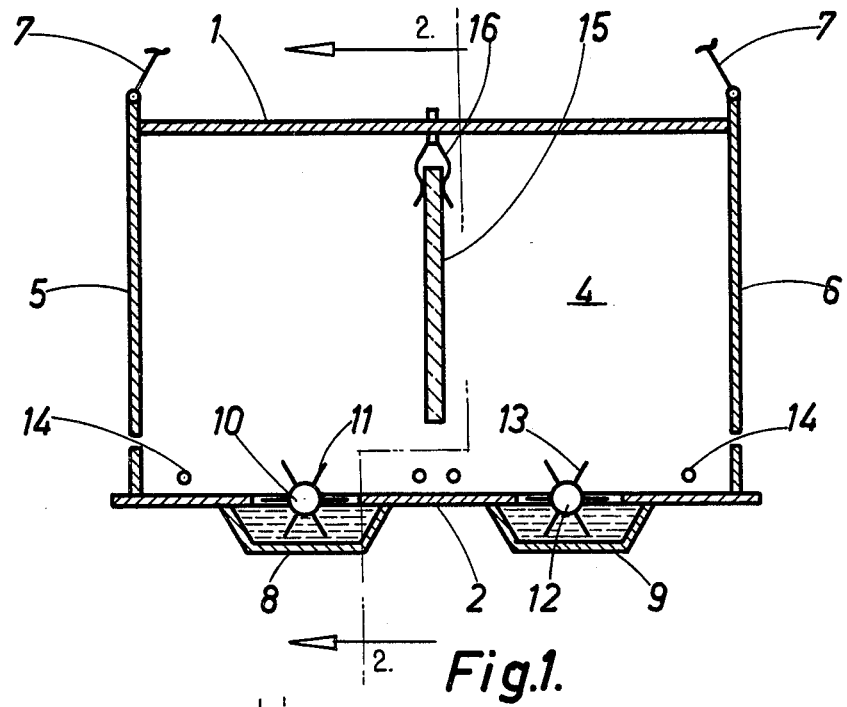
FIG. 1 is an elevational, cross-sectional view, along line 1—1 of FIG. 2, of one embodiment of apparatus according to the invention.
Figure 2:
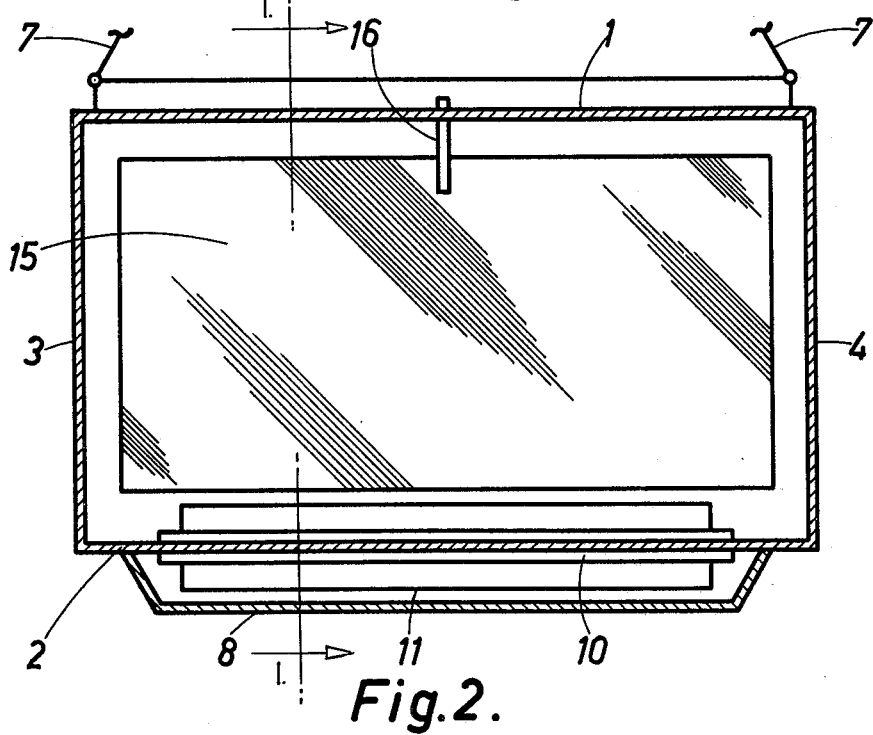
FIG. 2 is an elevational, cross-sectional view along line 2—2 of FIG. 1.

Referring firstly to FIGS. 1 and 2, the illustrated treatment chamber has a top wall 1, a bottom wall 2, lateral walls 3 and 4 and end walls 5 and 6 which are vertically displaceable by a suitable mechanism, part of which is indicated at 7, to enable articles to be treated to be moved into the chamber via one end and removed from the chamber via its other end. In the bottom of the chamber there are two troughs 8 and 9 holding quantities of a molten salt such as potassium nitrate. A cylinder 10 with radial paddle blades 11 is rotated in the trough 8 by a suitable drive means (not shown) to keep the molten salt therein in an agitated condition. A similar cylinder 12 with blades 13 is rotated in the trough 9. Blades 11 and 13 extend through the major part of the depths of their associated molten pools.

The requisite temperature in the chamber is maintained by electrical resistance heaters 14. A sheet of glass 15 or other article to be treated is suspended within the chamber by a suspension element 16. Due to the temperature in the chamber and the continued agitation of the molten salt, the salt contacting the article is in the form of droplets forming a mist which completely fills the chamber.

Figure 3:
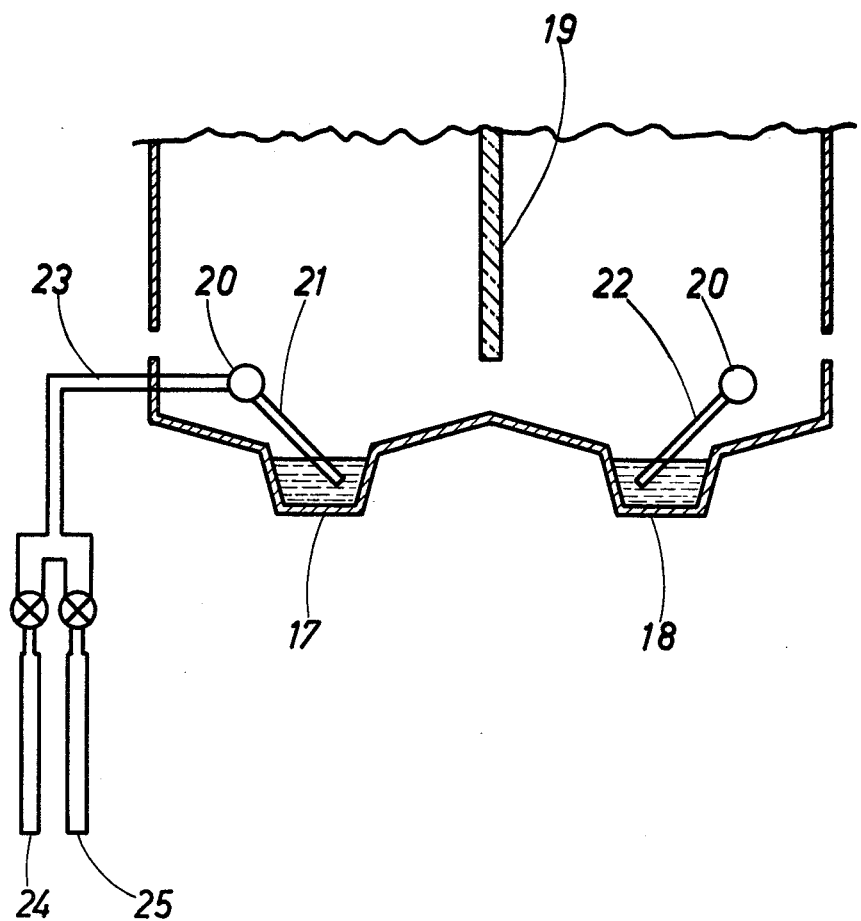
FIG. 3 is an elevational, cross-sectional view similar to that of FIG. 1 of the lower part of another apparatus according to the invention.

The apparatus shown in FIG. 3 includes a chamber made of oxidation-resistant steel, only the lower portion of which chamber is shown. The bottom wall of the chamber is formed with two troughs 17 and 18 situated respectively to one side and the other of the central vertical plane in which a glass sheet 19 or other article is suspended within the chamber. A conduit 20 is disposed along the bottom of the chamber and is shaped so that two portions of this conduit lie alongside, and parallel to, the troughs 17 and 18. Each of these two portions of conduit 20 is provided with a respective series of discharge tubes 21 and 22 distributed therealong. The outlet ends of these discharge tubes extend into the troughs 17 and 18. The conduit 20 is connected by a conduit 23 with two containers 24 and 25 holding gas under pressure which, when the apparatus is in use, is blown or bubbled through the quantities of molten salt held in the troughs 17 and 18. This embodiment also includes suitable means (not shown) for heating the interior of the chamber to the necessary operating temperature.

In either illustrated embodiment, the troughs can be refilled whenever desired.

The following are specific examples of processes according to the invention:

EXAMPLE 1

A sheet of glass 15 and a smaller piece of the same glass were treated in the apparatus shown in FIGS. 1 and 2, the glass having the following composition by weight:
$SiO_2$: 69%
$Na_2O$: 12%
CaO: 10%
MgO: 3%
$Al_2O_3$: 6%

The glass sheet measured 1.20m × 1.00m × 0.005m whereas the smaller sample measured 20cm × 3 cm × 0.005m.

The troughs 8 and 9 were filled with substantially pure potassium nitrate.

The temperature in the interior of the chamber was maintained at 475° C for 25 hours and during this time the cylinders 10 and 12 were rotated at 30 revolutions per minute to agitate the molten potassium nitrate in the troughs 8 and 9. In consequence of the temperature in the chamber and the agitation of the molten salt, the chamber was kept filled with a mist composed of droplets of molten potassium nitrate.

At the end of the 25-hour treatment period, the wall 6 was raised and the glass sheet 15 and the small sample were transported into a cooling compartment (not shown). It was found that the glass had a resistance to breakage by flexure corresponding to a tensile strength of 65 kg/mm$^2$. At different locations one measured also the tensile prestressing of the glass in the medium plane of the small sample in terms of optical birefringence retardation.

The optical retardation of light by birefringence is a well-known phenomenon and is utilized in the photo-elastic study of stresses in glass and other materials. When a ray of light is directed onto an edge face of a sheet of tempered glass parallel to the major surfaces of the sheet, the incident ray separates into two polarized rays which travel in the same direction but possess light vectors in different planes. The light vector of one ray lies in a plane parallel to the surfaces of the sheet while the light vector of the second ray is in a plane perpendicular to those surfaces. There are practically no stresses in planes perpendicular to the surfaces of the sheets, so that the second ray is substantially unretarded. The retardation of one of the polarized rays with respect to the other when the rays leave the sheet is a measure of the stresses in the sheet in a direction parallel to its major surfaces.

This relative retardation can be expressed as a difference in the distance traversed by the rays at the moment when the substantially unretarded ray leaves the glass and this retardation is proportional to the magnitude of the stresses in the sheet of glass parallel to its surfaces.

Nineteen different birefringence retardation measurements were made corresponding to nineteen different points of incidence of the light on an edge face of the glass, located at intervals of 1 cm along that edge face. The nineteen values showed a relative standard deviation in stress of 1%. The relative standard deviation is obtained by taking the squares of the differences between each measure and the mean value of the measures, summing up these squares and dividing this sum by the number of measures, taking the root of that value, and finally dividing by the mean value of the measures.

In a comparative test a sheet and a small sample of the same glass and dimensions were immersed in a bath of $KNO_3$ at 475° C for the same treatment period (25 hours). In this method of treatment, in order to obtain comparable stresses, it was necessary to use twenty times as much potassium nitrate as was used in the procedure of Example 1, above, according to the invention and the relative standard deviation in stress determined by a similar series of nineteen measurements was 4%.

In a further comparative test an identical sample and sheet were chemically tempered by spraying the glass for the same treatment period with molten potassium nitrate at 475° C. The molten salt continuously streamed along the surfaces of the glass and was collected and recycled by a pumping system. The quantity of potassium nitrate required for this treatment was three times the amount used in the foregoing Example 1 according to the invention and the relative standard deviation in stress, determined by a similar series of nineteen birefringence retardation measurements, was 2%.

By working according to the above Example 1 of the invention, a combination of advantages is thus realized. The tempering treatment requires less molten salt, there is no pumping equipment and consequently no corrosion problems, and the tempering is more uniform, as will be noted from a comparison of the values of the birefringence retardation measurements determined for different positions of the incident light ray.

EXAMPLE 2

A sheet of window glass having the following composition by weight:
$SiO_2$: 72%
$Na_2O$: 14.2%
CaO: 8.1%
MgO: 4.5%
$Al_2O_3$: 1.2%
and measuring 1.8m × 0.9m × 0.003m heated to a temperature of 470° C, and suspended in a vertical plane in an apparatus having the form shown in FIG. 3, the bottom edge of the sheet being 30cm above the bottom of the treatment chamber. Each of the troughs 17 and 18 measured 180cm × 15cm at the top thereof, was 12 cm in depth, and initially was almost completely filled with molten salt although this is not absolutely necessary. Each of the portions of conduit 20 running parallel with the plane of the glass sheet had 17 discharge tubes 21 or 22 which were uniformly spaced along the length of the corresponding trough and extended to a depth of 10 cm into such trough to be below the level of the molten salt pool during the entire treatment. A mixture of air and $CO_2$ in a volume ratio of 3:1 was blown through the tubes from the containers 24 and 25, the total quantity of gas issuing through the thiry-four tubes being 300 liters per minute. Due to the temperature in the chamber and the bubbling of the gas through the molten potassium nitrate contained in the troughs 17 and 18, the chamber was kept filled with a mist composed of fine droplets of the potassium nitrate. The sloping of the bottom wall of the treatment chamber caused potassium nitrate condensing on such bottom wall to drain back into the troughs.

The treatment was continued for 19 hours during which period the temperature of the molten salt and the glass sheet was maintained at 490° C. A sample piece of the same glass, measuring 20cm × 3 cm × 0.003m was subjected to the same treatment simultaneously with the sheet of glass.

It was found that as a result of the treatment the glass had a resistance to breakage by flexure corresponding to a tensile strength of 53 kg/mm$^2$ and the relative standard deviation in stress, determined by a series of nineteen birefringence retardation measurements performed on the small sample in the same way as in Example 1 was 1%.

In a comparative test an identical sample of the same glass was subjected to chemical tempering by immersion in a bath of the same composition, i.e. molten potassium nitrate, at the same temperature and for the same length of time as set forth above while a mixture of air and $CO_2$ was blown through the bath of molten salt. A similar series of birefringence retardation measurements was made and it was found that the relative standard deviation in stress was 5%. This showed that the uniformity of the tempering treatment was appreciably less satisfactory than when working according to the foregoing Example 2 according to the invention.

EXAMPLE 3

A sheet of vitrocrystalline material formed from a sheet of the following composition by weight:
$SiO_2$: 48%
$Al_2O_3$: 32%
$Na_2O$: 10%
CaO: 2%
$TiO_2$: 8%
and measuring 30cm × 50cm × 0.1cm was treated in an apparatus as represented in FIG. 3 but of smaller dimensions than the apparatus used in Example 2. The sheet of vitrocrystalline material was treated together with a sample piece of the same material measuring 20cm × 3cm × 0.1cm which was likewise supported in a vertical plane in the treatment chamber.

The troughs 17 and 18 were filled with a mixture consisting of 10% by weight of $LiNO_3$ and 90% by weight of $NaNO_3$. The treatment period was 20 minutes, during which time the salt mixture and the sheet and sample piece of vitrocrystalline material were maintained at 590° C, and a proportional quantity of the same gas as that used in Example 2 was bubbled through the salt.

The prestressing of the sample was determined at nineteen different places located at intervals of 1 cm along one surface of the sample, using an epipolarimeter. The sample was not sufficiently transparent in its central layers to permit relative birefringence retardation to be measured in the median plane of the sheet. The relative standard deviation in stress determined from the 19 measurements was 2%.

In a comparative test, an identical mixture of nitrates was sprayed at the same temperature against an identical sheet and sample of vitrocrystalline material, the molten medium being allowed to stream along their surfaces. The relative standard deviation in stress, determined from a similar series of 19 measurements, was 4.5% and it was necessary to use three times the amount of molten medium as in the foregoing performance of Example 3 according to the invention.

Further comparative tests were made using a mixture of salts consisting of 55% by weight of NaCl and 45% by weight of $LiNO_3$ at 575° C. One of these tests was conducted in apparatus as used in the foregoing Example according to the invention, while in the other test the mixture of salts was sprayed against and allowed to stream along the sample surfaces. The relative standard deviation in stress determined on the basis of 19 measurements using an epipolarimeter was 2.5% for the sample treated according to the invention and 4% for the other sample. In a further comparative test an identical sample was immersed in a bath consisting of the same salt mixture of NaCl and $LiNO_3$. The relative standard variation determined for this treated sample was 6%.

EXAMPLE 4

A sheet of vitrocrystalline material formed from a sheet of the following composition by weight:
$SiO_2$: 63%
$Al_2O_3$: 24%
$LiO_2$: 5%
$TiO_2$: 5%
CaO: 1.5%
F: 0.5% the sheet measuring 30cm × 30cm × 1.0cm was treated in apparatus as used in Example 1 but of smaller dimensions. The troughs 8 and 9 were filled with a salt mixture consisting of 50% by weight of NaCl and 50% by weight of $MgCl_2$ and the treatment was performed at 570° C. The cylinders 10 and 12 were continuously rotated to agitate the molten salt baths so as to generate a mist composed of droplets of the molten salt. The sheet was treated, together with a sample piece of the same vitrocrystalline material measuring 20cm × 3cm × 1.0cm, for a period of 1 hour.

The treated sheet had a resistance to breakage by flexure corresponding to a tensile strength of 56 kg/mm².

The compressive stresses in the sample were measured at nineteen different places by means of an epipolarimeter. The relative standard deviation in the compressive stresses across the sample was 2.8%.

In a comparative test an identical sample was treated at the same temperature and for the same length of time by immersion in a bath of the same molten salt mixture. The treated sample showed a relative standard deviation in compressive stresses of 7%.

EXAMPLE 5

Glass goblets made of soda-borosilicate glass of the following composition by weight:
$SiO_2$: 60%
$Na_2O$: 12%
CaO: 10%
MgO: 6%
$B_2O_3$: 6%
$Al_2O_3$: 5%
$P_2O_5$: 1%
and having a wall thickness of 5mm were suspended in a treatment chamber with the rims of the goblets directed downwardly. The goblets were treated in the chamber together with a sample piece of glass of the same composition measuring 20cm × 3cm × 5mm, the sample being suspended in a vertical plane.

In the bottom of the treatment chamber there was a pool of molten salt consisting of a mixture of 20% by weight of AgBr and 80% by weight of $Ag_2SO_4$ maintained at a temperature of 540° C. Air was blown into the pool in order to generate a mist composed of droplets of the molten salts. The treatment was continued for two hours.

As a result of the treatment, the goblets and the sample acquired a yellow coloration. The absorption coefficient of the sample, with respect to light directed through the thickness of the sample, was measured at nineteen places across the sample. The relative standard deviation in absorption coefficient was 4%.

In a comparative test, an identical goblet and an identical sample were sprayed with the same salt mixture and at the same temperature for the same treatment period, in the presence of air. The relative standard deviation based on nineteen similar measurements was in this case 7%.

EXAMPLE 6

A sheet of glass of the following composition by weight:
$SiO_2$: 69%
$Na_2O$: 12%
CaO: 10%
$Al_2O_3$: 6%
MgO: 3% and measuring 40cm × 80cm × 0.6cm was suspended together with a sample piece of the same glass measuring 20cm × 3cm × 0.6cm, in apparatus similar to that used in Example 1. The troughs in the bottom of the treatment chamber were filled with potassium nitrate at 480° C containing 0.3% by weight of $K_2CO_3$ and the molten salt mixture was continuously agitated to maintain the chamber filled with a mist composed of droplets of the molten salts. A current of air was blown along the surfaces of the sheet, the velocity of this air current being sufficient to entrain the smallest of the molten salt droplets, as well as the vapor phase, leaving only the larger droplets of molten salt in contact with the glass.

Examination of the treated sample showed that the compressive stressing of the glass was particularly uniform from one point on the sample to another. The relative standard deviation in stress, determined on the basis of nineteen measurements by means of an epipolarimeter, was only 0.5%. A comparative test on an identical sample was performed which was identical to the test described with the exception that the air current was omitted. In this case, the relative standard deviation in stress, determined on the basis of an identical series of measurements, was 1.5%. In a further comparative test, an identical sample was treated at the same temperature and for the same time with the same salt mixture but by spraying the salt mixture onto the sample. In that case, the compressive surface stressing of the sample was less uniform, the relative standard deviation in stress being 3%.

EXAMPLE 7

A glass sheet was treated in a dense mist of $KNO_3$ droplets.

The glass sheet of the following composition,
$SiO_2$: 69%
$Na_2O$: 12%
MgO: 7%
CaO: 6%
$Al_2O_3$: 6% measuring 30cm × 30cm × 0.4cm was suspended in a dense mist of $KNO_3$ droplets created by four sprayers or atomizers, situated near the four lower corners of a treatment chamber of rectangular shape. A mist was formed in each corner and diffused in the chamber towards the glass sheet.

The bottom of the chamber was formed by four triangular inclined plates which receive falling liquid to direct it towards an evacuation opening in the center of the bottom. This evacuation opening is connected by means of four tubes which conduct the liquid underneath the chamber and back towards the sprayers. These sprayers operate by means of compressed air which passes through the molten $KNO_3$ and which subsequently leaves the treating zone through an orifice in one of the lateral walls of the chamber.

The glass sheet, suspended in the center of the chamber, just over the $KNO_3$ evacuation opening, is thus contacted by the droplets of the mist formed by the four atomizers.

The $KNO_3$ salt used was at a temperature of 490° C. The sheet and a sample measuring 20cm × 3cm × 0.4 cm were maintained in the mist of the droplets for 20 hours.

The variation in the stresses created on the surface of the sample measuring 20cm × 3cm × 0.4cm was measured. The relative standard deviation of the 19 measurements was 1%.

The same test was repeated with a projection of continuous $KNO_3$ streams along the surfaces of an identical sheet and sample. In this case, 15 times more $KNO_3$ was utilized. The relative standard deviation of the stresses was 2.5%.

EXAMPLE 8

A sheet of glass of the same size and composition as that used in Example 7 was treated together with a small sample of the same glass measuring 20cm × 3cm × 0.4cm in an apparatus as used in Example 2 but of smaller dimensions. The troughs 17 and 18 were filled with molten $CsNO_3$ at 470° C. A mixture of $CO_2$ and air in a volume ratio of 1:2 was blown through the molten salt at a rate of 20 liters per minute and per discharge tube. The treatment was continued for 24 hours.

By this treatment, the sheet of glass acquired a resistance to breakage by flexure corresponding to a tensile strength of 150 kg/mm$^2$.

The relative standard deviation in stress determined from measurements made at nineteen different places on the small sample was 2%.

In a comparative test, continuous streams of $CsNO_3$ at 470° C were directed along an identical sheet and sample for the same period of time. In this case, the relative standard deviation in stress determined on the basis of nineteen similar measurements was 3.5%.

EXAMPLE 9

A glass sheet of identical composition to that used in Example 7 was treated in the chamber described in Example 7. On each side of the sheet and of a sample of the same composition and measuring 20cm × 3cm × 0.4cm perforated electrodes were placed at a distance of 4cm from the sheet. Holes of a diameter of 0.5cm were formed in the electrodes to permit a good contact of the $KNO_3$ mist with the sheet and the sample. A direct electrical field was applied between the electrodes by means of a voltage of 1000 volts between the electrodes at opposite sides of the articles. The treatment lasted 10 minutes. The variation in the stresses created in the surface of the sample measuring 20cm × 3cm × 0.4cm was measured. The relative standard deviation was 2%.

The same test was repeated with a continuous projection of $KNO_3$ streams along the surfaces of an identical sheet and sample. In this case, twenty times the salt quantity was needed and a relative standard deviation of 3.5% was observed.

In another test, an electrical alternating field having an intensity of 150 volts per cm and a frequency of 9 cycles per hour was applied.

In this case, a relative standard deviation of 5% was observed for a treatment by a mist of fine droplets, and of 11% for a treatment by continuous streams.

Thus, in all experiments conducted, treatment with a mist produced results superior to those achieved by treatments which were identical except for the fact that the liquid medium was in a form other than a mist. Since the clear result of the process according to the invention is to improve the uniformity of the diffusion of a substance across the surface of an article, it is to be expected that a similar improvement in uniformity will result if the invention is practiced in conjunction with any other type of diffusion treatment.

It will be understood that the above descrption of the present invention is susceptible to various modifications, changes and adaptations and the same are intended to be comprehended within the meaning and range of equivalents of the appended claims.

We claim:

1. In a process for chemically tempering at least part of a body of glass or vitrocrystalline material by diffusing ions into at least part of the body from a contacting medium composed of at least one molten metal salt and constituting a source of such ions, the body being disposed in an enclosure for the chemical tempering operation, the improvement comprising providing at least one pool of the medium within said enclosure, said pool being out of contact with and below the body bubbling gas through the pool in order to agitate the medium in the pool sufficiently to place said medium in the form of a mist composed of liquid droplets of such molten salt, which mist fills the enclosure and contacts the body; and continuously replenishing the medium contacting the body.

2. A process as defined in claim 1 wherein said medium is anhydrous and comprising the further step of maintaining the temperature of the region in which the body is disposed above 100° C.

3. A process as defined in claim 1 wherein the metal salt is an alkali salt.

4. A process as defined in claim 1 wherein the gas mixes with the resulting mist and has a composition such that it acts as an adjuvant promoting the diffusion of ions from the medium into the body.

5. A process as defined in claim 1 wherein the body is of a composition such that the diffusion of ions from the medium into the body is accompanied by a corresponding diffusion of ions of a different type from the body into the medium.

6. A process as defined in claim 1 wherein the ions diffusing into the body are of a type which create compressive surface stresses in the body and comprising the further step of subjecting the body to a temperature, and performing the diffusion for a time, sufficient to cause such stresses to be produced.

7. A process as defined in claim 6 wherein the composition of the medium and the body are such that ions diffuse out of surface layers of the body in exchange for ions from the diffusion medium which impart a lower coefficient of thermal expansion to such surface layers, and said step of subjecting is carried out by placing the body at a sufficiently high temperature and maintaining it at that temperature for a sufficient time to cause substantial stress relaxation to occur in the body.

8. A process as defined in claim 7 wherein the contacting medium constitutes a source of lithium ions which diffuse into the body and the ions diffusing out of the body are sodium ions.

9. A process as defined in claim 6 wherein the composition of the medium and the body are such that the ions diffusing from the medium into surface layers of the body replace smaller ions which diffuse out of the body surface layers into the diffusion medium and said step of subjecting is carried out at a temperature and for a time to prevent complete stress relaxation from occurring in the body, and comprising the further step of subsequently cooling the body so as to maintain the compressive surface stresses resulting from the ion exchange.

10. A process as defined in claim 9 wherein the ions diffusing into the body from the medium are potassium ions and the ions diffusing out of the surface layers of the body into the medium are sodium ions.

11. A process as defined in claim 10 wherein the treatment medium is composed of a mixture of molten potassium nitrate and molten potassium carbonate.

12. A process as defined in claim 9 wherein the gas bubbled through the pool contains carbon dioxide.

13. A process as defined in claim 12 wherein the gas also contains air.

14. A process as defined in claim 1 wherein the ions diffusing from the contacting medium into the body are of a type which alters the color of the body.

15. A process as defined in claim 1 wherein the body is in the form of a sheet.

16. A process as defined in claim 1 wherein the body is in the form of a hollow-ware article.

* * * * *